United States Patent
Shimoda

[19]
[11] Patent Number: 5,944,829
[45] Date of Patent: Aug. 31, 1999

[54] ADJUSTING SOFTWARE CHARACTERISTICS BY USER INTERFACE BASED UPON BATTERY LEVEL AND THE AMOUNT OF TIME THE USER WANTS THE BATTERY TO LAST

[75] Inventor: Marion Haruko Shimoda, Aloha, Oreg.

[73] Assignee: Intel Corporation, Santa Clara, Calif.

[21] Appl. No.: 08/723,792

[22] Filed: Sep. 30, 1996

[51] Int. Cl.⁶ ........................................ G06F 1/32
[52] U.S. Cl. .................. 713/324; 713/310; 713/330; 713/340
[58] Field of Search ............. 395/750.01–750.08; 713/300, 310, 320, 322, 323, 324, 330, 340

[56] References Cited

U.S. PATENT DOCUMENTS

| | | | |
|---|---|---|---|
| 5,511,202 | 4/1996 | Combs et al. ........................ | 395/750 |
| 5,517,645 | 5/1996 | Stutz et al. ........................... | 395/700 |
| 5,535,401 | 7/1996 | Rawson, III et al. ................. | 395/750 |
| 5,566,340 | 10/1996 | Stewart et al. ...................... | 395/750 |
| 5,577,220 | 11/1996 | Combs et al. ....................... | 395/416 |
| 5,598,565 | 1/1997 | Reinhardt ............................. | 395/750 |
| 5,640,574 | 6/1997 | Kawashima ......................... | 395/750 |
| 5,654,923 | 8/1997 | Mizobata et al. ................ | 365/189.01 |
| 5,692,204 | 11/1997 | Rawson et al. ..................... | 395/750 |
| 5,724,592 | 3/1998 | Garner .............................. | 395/750.04 |

*Primary Examiner*—Thomas C. Lee
*Assistant Examiner*—Harold Kim
*Attorney, Agent, or Firm*—Kenyon & Kenyon

[57] ABSTRACT

A method and device for adjusting the power consumption of a computer system are disclosed. A user application running on the computer system is arranged to operate in any one of a preselected number of operating modes. A power conservation module obtains power characteristics from a power information module, selects one of the preselected number of operating modes of the user application, as a function of the power characteristics obtained from the power information module, and causes the user application to operate in the selected operating mode.

16 Claims, 3 Drawing Sheets

5,944,829

ADJUSTING SOFTWARE CHARACTERISTICS BY USER INTERFACE BASED UPON BATTERY LEVEL AND THE AMOUNT OF TIME THE USER WANTS THE BATTERY TO LAST

FIELD OF THE INVENTION

The present invention is directed to a portable computer system. More particularly, the present invention provides a mechanism for power conservation to optimize battery life for a battery mounted within the portable system.

BACKGROUND OF THE INVENTION

Many modern computer systems are implemented in light weight, portable designs that enable a user to carry the computer wherever the user may travel. Such portable computers are called "laptops" or "notebooks" (hereinafter generally referred to as a laptop). Laptops typically include alternate sources of power so that the user may either plug the laptop into an electrical wall outlet or use a battery mounted within the laptop. Battery life is an important design characteristic for laptop computers since users desire a maximum amount of time to use the laptop while away from an environment affording access to an electrical outlet.

Accordingly, power conservation schemes and mechanisms have been proposed to minimize power consumption during battery operation to prolong the amount of time the battery can be used to power the laptop. One example of power conservation can be found in disk drive technology. Most laptops include a hard disk drive for storage of computer programs and data. Disk drives consume a significant amount of power for both the onboard electronics of the disk drive and the spindle and actuator motors used to spin the disk and rotate the read/write head of the drive. Modern disk drives designed for use in laptops and other portable devices include timers to track the amount of elapsed time between accesses to the drive to store or retrieve data.

When the elapsed time measured by the timer exceeds a predetermined amount, certain components of the disk drive are powered down. For example, the disk drive electronics can be powered down after a first preselected time period and the spindle motor can be powered down after a second, longer preselected time period. In this manner, power consumption by the laptop is minimized during periods of time when access to the disk drive is not required, to lengthen the battery life.

An Advanced Power Management (APM) specification has been jointly developed by the Intel Corporation and the Microsoft Corporation (Advanced Power Management (APM) BIOS Interface Specification, Revision 1.2, February 1996, http://www.intel.com/IAL/powermgm, expressly incorporated herein by reference). The purpose of the APM power management specification is to provide power management support in computers with power manageable hardware. APM defines a layered cooperative environment in which applications, operating systems, device drivers and power management BIOS work together to reduce overall power consumption by the computer.

The layered environment includes APM-aware applications comprising, for example, user applications available on the computer. The APM-aware applications are modified to communicate application operating characteristics to the lower levels of the APM when the application is being run on the computer, so that the APM can control power conservation measures to suit the particular characteristics of the application. For example, in the MS-DOS operating system, the application being run on the computer is often the best source of information on when the application is idle and awaiting further activity. Idle information can also be communicated to the APM by the operating system of the laptop. The APM can use idle information to provide the most effective power conservation in the system by controlling hardware elements to minimize power consumption during idle periods.

Moreover, the APM can communicate power conservation information to user applications to facilitate power conservation. For example, when the APM decides to place the laptop in a hibernation mode, an advance notice of the hibernation mode can be transmitted to an APM aware user application running at the time. The APM aware application is configured to store application state information upon notification, so that the application can immediately resume operation upon termination of the hibernation mode.

Modern user applications typically run on laptops include word processors, graphics programs, databases and spread sheet programs. These application programs often include background operations performed periodically to maintain the integrity of program functionality. For example, a word processor performs repagination, spell check and back-up operations. A back-up operation periodically stores a current document in a temporary disk drive location so that a current or near current version of the document is always available to the user should the system fail during use of the program. In the event of a failure, the user can re-boot the laptop and then retrieve a copy of the current or near current version of the document from the temporary disk drive location.

While background operations of user programs improve the overall performance of the program and the laptop, the operation of the background functions consume a significant amount of power. The background operations cause the laptop electronics to operate periodically in a higher power consumption mode, and, in some instances, as for example in a back-up operation, to access the disk drive. Accordingly, the effectiveness of the APM and disk drive power conservation schemes is lessened in order to accommodate background operations of user applications. The result is improved performance and integrity in respect of data processing operation of the laptop, but not as long a battery life as a user may desire.

SUMMARY OF THE INVENTION

The present invention provides a new and improved power conservation scheme for use in connection with user applications. Generally, each user application is implemented with a power conservation software module that can include a user interface. The power conservation module stores default preferences or user designated preferences, via the user interface, regarding battery life, monitors power characteristics of the laptop, for example via communication with the APM, and operates the user application in accordance with the default or user preferences and the monitored power characteristics.

In an exemplary embodiment of the present invention, the monitoring function of the power conservation module determines whether the laptop is being powered by the battery or an electrical outlet. The monitoring function can also determine, via a module such as the APM, other power characteristics, including the power level or remaining capacity of the battery, as an indication of remaining battery life. The user interface permits a user to set application operation as a function of the monitored power characteristics. The user may specify, for example, that the application is to operate in a "read only" mode when the laptop is powered by the battery. In the read only mode, the application will not have to perform any background operations since retrieved documents will not be altered.

A read only mode or other power conservation preference can also be set as a default power conservation preference. When a default option is to be exercised by the power conservation module, the user interface can be used to notify the user of the power conservation mode, and provide the user with the option to override the default preference.

In this manner, the user has access to documents for review, while traveling. However, the read only mode of operation specified by the default preference or user will result in a longer battery life since the application can operate in a lower power mode without any need to perform background operations after retrieval of a document. The present invention, therefore, extends the benefits of other power conservation schemes, while itself lengthening battery life by affording a user low power consumption options with respect to operating modes of user applications. Moreover, the low power modes, such as the read only mode, can automatically be suspended, as for example, as soon as the user strikes a key. Thus, a user can retrieve a document and minimize power consumption until the user is actually ready to modify the document.

DETAILED DESCRIPTION

Figure 1:
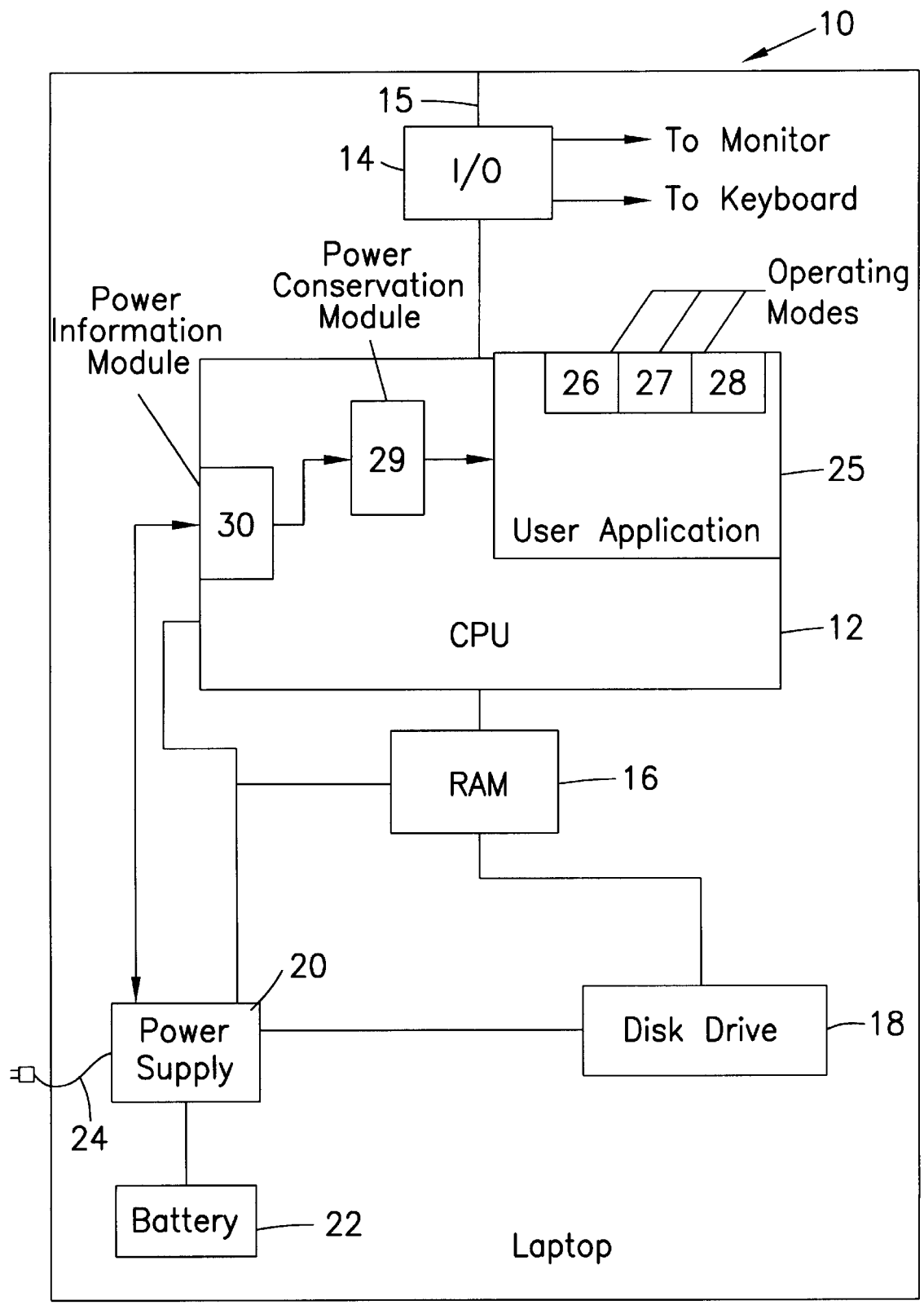
FIG. 1 is a block diagram of a laptop computer system implementing the present invention.

Referring now to the drawings, and initially to FIG. 1, there is illustrated a laptop computer system generally indicated by the reference numeral 10. The laptop 10 generally comprises a CPU 12, input/output device 14, RAM 16, disk drive 18, and power supply 20. The CPU 12 represents the hardware of the system that must be powered to perform computations and other logic operations of the laptop 10. The CPU 12 is coupled to the RAM 16, which stores, for example, instructions from an application program being run by the laptop 10, and related data. The disk drive 18 is the non-volatile memory component of the laptop 10, and stores all of the application programs and data used by the CPU 12.

A coupling between the disk drive 18 and RAM 16 is used to transfer an application program and related data to the RAM 16 when retrieved by a user. Output data generated by the CPU 12 during the running of a program is also transferred via the coupling from the RAM 16 to the disk drive 18 for long term storage and later use. The input/output device 14 couples the CPU 12 to various I/O ports 15 provided on the laptop 10 and to a monitor and keyboard (not shown) mounted on the laptop 10, as is generally known in the art.

AS illustrated in FIG. 1, the power supply 20 is coupled to each of the CPU 12, RAM 16 and disk drive 18 to provide power to these components during operation of the laptop 10. Typically, in modern laptop computers, the power supply is coupled to each of a battery 22 and a wall outlet plug 24. In this manner, the power supply 20 can provide power to the laptop 10 from either an electrical outlet, if available, or the battery 22 so that a user is afforded maximum flexibility in the use of the laptop 10. Thus, when the user is at home or in the office, the plug 24 of the laptop 10 can be plugged into a wall outlet, to power the laptop in the same manner as a desktop computer. However, when the user is away from an electrical outlet, power can be obtained from the battery 22.

In the exemplary embodiment of the laptop implementing the present invention, the CPU 12 is coupled to the power supply 20 for communications regarding the source of power (outlet or battery) and information on the power levels and other characteristics of the battery. The communication can be according to a protocol such as the APM discussed above, which is implemented in the CPU 12 and power supply 20. The power supply 20 and battery 22 can also be implemented with Smart Battery Systems Specifications jointly developed by the Intel Corporation and Duracell (http://www.intel.com/ial/powermgm/SBOVR.HTM, expressly incorporated herein by reference). The Smart Battery Specifications define a set of hardware and software interfaces as a basis for a common information mechanism regarding battery characteristics.

A user application 25 can operate in an operating mode 26, 27, or 28 according to the power characteristics of the computer system and possibly a user input. A power information module 30 is in communication with the power supply 20. A power conservation module 29 is in communication with the power information module 30 and the user application 25.

Each application stored in the disk drive 18 for retrieval and operation on the laptop 10 is APM-aware, according to the APM. In addition, according to the present invention, each application includes a power conservation module, as illustrated by the flow chart of FIG. 2. The power conservation module shown in the flow chart can be implemented as a single routine or distributed throughout the user application or including subroutines in the operating system or the APM.

Figure 2:
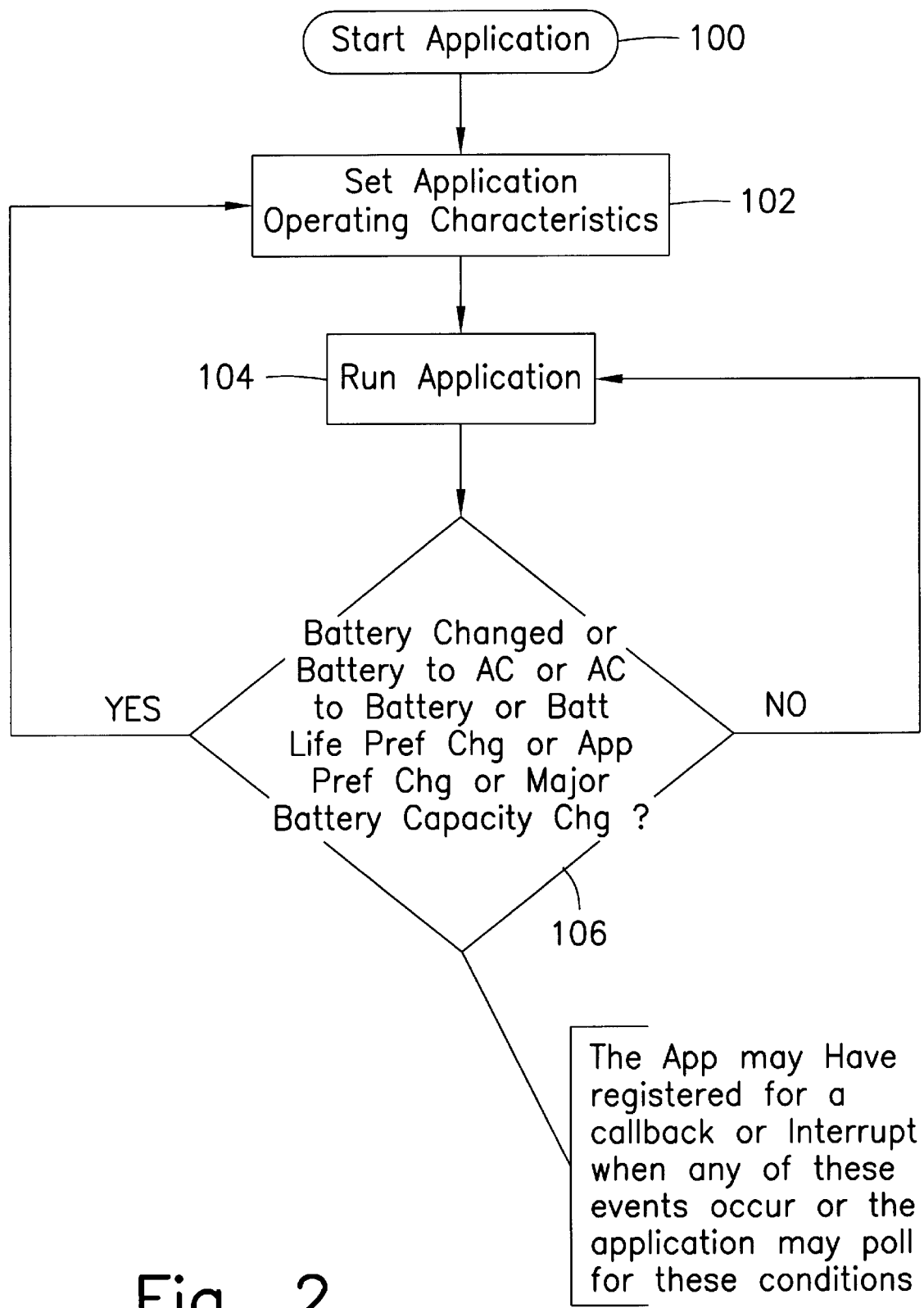
FIG. 2 is a flow chart of a power conservation module, according to the present invention, and implemented in user applications stored and operated in the laptop of FIG. 1.

Referring to FIG. 2, upon start of an application 100, the application program goes to a SET APPLICATION OPERATING CHARACTERISTICS routine 102. This routine adjusts the operating mode of the application as a function of default preferences or user selected preferences, battery use and battery characteristics, as will be described in detail below. When the SET APPLICATION OPERATING CHARACTERISTICS routine 102 is done, the application goes to a RUN APPLICATION mode 104 wherein the application runs in performance of the intended purpose of the application, e.g., as a wordprocessor, graphics program, spreadsheet, database, etc., according to the mode of operation set by the SET APPLICATION OPERATING CHARACTERISTICS routine 102.

Pursuant to a feature of the present invention, the RUN APPLICATION mode 104 is interrupted by an interrupt or callback from the APM, upon a change in power characteristics of the system or user preferences, as shown in decision box 106. In this regard, the APM can be designed to include a callback feature wherein a user application can register with the APM for a callback to communicate changes in power characteristics information. In the alternative, the SET APPLICATION OPERATING CHARACTERISTICS routine 102 can include an interrupt routine to interrupt the RUN APPLICATION mode 104, upon a change in battery characteristics or user preferences, and detect power characteristics or user preference information. As a further alternative, the application itself or the power conservation module can be programmed to periodically go to decision block 106 to poll the APM to determine changes in power characteristics or to determine changes in user preferences. In either event, the power characteristics can include, by way of example, indications of a change of battery, a switch from battery power to an AC wall outlet, or vice versa, a change in remaining battery capacity, or a change by the user in battery life preferences or application operating mode preferences, as will be described in connection with the SET APPLICATION OPERATING CHARACTERISTICS routine 102.

If, upon an interrupt or polling operation, any of these changes is indicated, the decision block 106 (YES) goes to the SET APPLICATION OPERATING CHARACTERISTICS routine 102 before resuming the RUN APPLICATION mode 104. If there is no change in any of the power characteristics or user preferences, the decision block 106 (NO) returns to the RUN APPLICATION mode 104.

Figure 3:
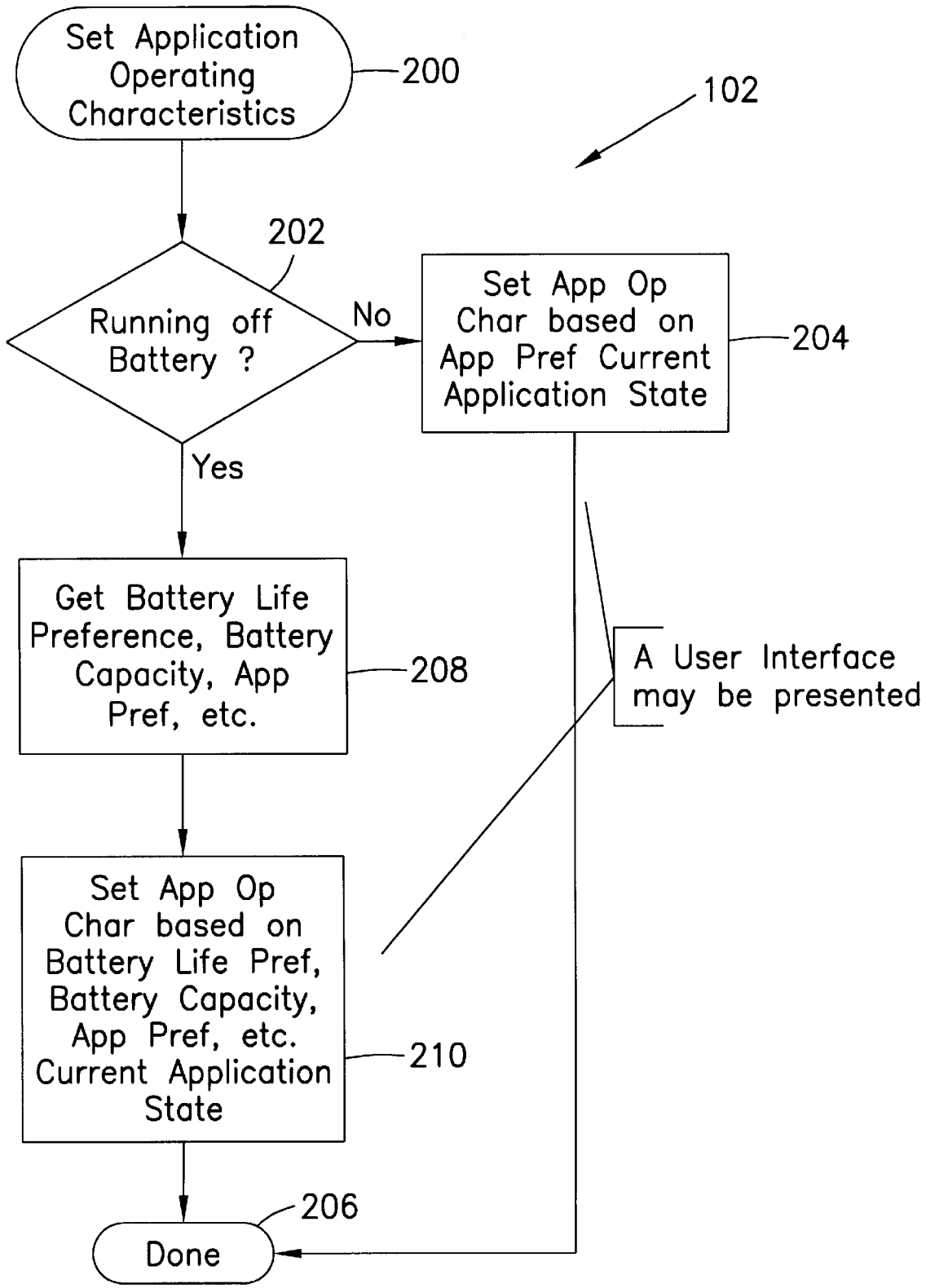
FIG. 3 is a flow chart of the SET APPLICATION OPERATING CHARACTERISTICS box of the flow chart of FIG. 2.

Referring now to FIG. 3, there is illustrated a flow chart for the SET APPLICATION OPERATING CHARACTERISTICS routine according to the present invention. Upon a start 200 of the SET APPLICATION OPERATING CHARACTERISTICS routine 102, the routine goes to a RUNNING OFF BATTERY decision block 202. The decision block 202 determines, e.g., via the APM, whether the laptop 10 is operating off of battery power or is plugged into an AC outlet.

If the laptop 10 is not operating off of the battery (202-NO), the routine 102 goes to a SET APPLICATION OPERATING CHARACTERISTICS BASED UPON APPLICATION PREFERENCES routine 204. This routine can be implemented as a user interface providing the user with various options regarding the operation of the application. The routine can be initialized with default preferences. The preferences can be, but are not necessarily related to battery power operation. The preferences regarding power conservation can include opening the application in read only mode, or performing background operations less frequently, e.g., performing a back-up operation every six minutes rather than every three minutes, during battery operation.

In addition, the user can be presented with options regarding battery life, such as set application operation to prolong battery life or without regard to battery life. Moreover, the user can specify application characteristics as a function of remaining battery capacity. Thus, for example, the preference can cause the application to be opened in read only mode if remaining battery capacity is less than a preselected amount. A further preference can be to change from read only to full capability as soon as the user hits any key. After the user has designated application preferences, the selected preferences are stored and the routine goes to a DONE box 206 for return to the RUN APPLICATION mode 104 (see FIG. 2).

If the laptop 10 is operating off of the battery (202-YES), the routine 102 goes to a GET PREFERENCES routine 208. The GET PREFERENCES routine 208 retrieves the preferences, either the default preferences or the preferences selected by the user pursuant to routine 204, as well as battery characteristics determined during the interrupt or polling operation of block 106 (FIG. 2). The routine 208 then goes to a SET APPLICATION OPERATING CHARACTERISTICS routine 210.

The SET APPLICATION OPERATING CHARACTERISTICS routine 210 can also present a user interface to allow the user to change or add preferences at this time. The routine 210 then sets the application operating characteristics based upon the preferences selected by the user or the default preferences. Thus, for example, if the preference calls for opening the application in read only mode when remaining battery capacity is less than a certain amount, and GET PREFERENCES routine 208 determines that the laptop 10 is being operated with a battery having a remaining capacity less than the certain amount, then the application is set to run in the RUN APPLICATION mode 104 (see FIG. 2) in a read only mode. The routine 210 then goes to DONE 206 for return to the RUN APPLICATION mode 104.

If, in the example, the user changes the preferences to only reduce the frequency of back-up operations, then the application is run during the RUN APPLICATION mode 104 with full capabilities, but does not back-up documents as often as usual, to minimize background operation of the application.

When the preferences received from the GET PREFERENCES routine 208 are default preferences, a user interface can be presented to the user to notify the user that application characteristics are being modified for power conservation according to default preferences. The user is then given an option to override the default preferences.

In each of the GET PREFERENCES routine 208 and SET APPLICATION OPERATING CHARACTERISTICS routine 210, the current state of the user application running on the laptop 10 can also be detected. The current state information is used to determine changes that need to be made to application operating characteristics.

In this manner, according to the present invention, information acquired by a utility such as APM is made available for use in setting actual operating characteristics of a user application in relation to the state of a battery being used to power a portable computer. Of course, the power conservation preferences can also be set relative to AC operation, when the laptop is plugged into a wall outlet, to reduce power consumption.

I claim:
1. In a computer system having a CPU running a user application, the user application including at least a first operation and a second operation, the computer system being powered by a power source, a method for conserving power consumption, comprising the steps of:
   providing a power information module for determining power characteristics of the power source;
   providing a power conservation module for operation in connection with the user application to obtain the power characteristics from the power information module;
   providing a user interface in the power conservation module;
   arranging the user application for operation in any one of a preselected number of operating modes that control the execution of the first operation and the second operation, and wherein at least one of the operating modes suspends the execution of one of the first operation and the second operation and allows the execution of one of the second operation and the first operation;
   operating the user interface to select one of the preselected number of operating modes of the user application with reference to the power characteristics obtained from the power information module; and
   operating the power conservation module to cause the user application to operate in the selected operating mode.

2. The method of claim 1 wherein the power source comprises a battery.

3. The method of claim 1 comprising the further step of operating the power information module to interrupt the user application when power characteristics have changed so that the power conservation module can operate to select one of the preselected number of operating modes of the user application as a function of the power characteristics obtained from the power information module.

4. The method of claim 1 comprising the further step of operating the power conservation module to periodically poll the power information module to obtain the power characteristics.

5. The method of claim 1 comprising the further step of providing a callback routine in the power information module and using the callback routine to communicate power characteristic changes to the power conservation module.

6. The method of claim 1 wherein one of the preselected number of operating modes comprises a read only mode.

7. The method of claim 1, comprising the further step of operating the power conservation module to select another of the preselected number of operating modes of the user application upon use of the user interface to select such another one of the preselected number of operating modes of the user application.

8. A computer system comprising:
   a CPU running a user application, the user application including at least a first operation and a second operation;
   a power source for the CPU;
   a power information module for determining power characteristics of the power source; and
   a power conservation module including a user interface;
   the user application operating in any one of a preselected number of operating modes that controls the execution of the first operation and the second operation;
   at least one of the operating modes suspends execution of one of the first operation and the second operation and allows execution of one of the second operation and the first operation;
   the power conservation module obtaining the power characteristics from the power information module, selecting one of the preselected number of operating modes of the user application as a function of the power characteristics obtained from the power information module, and causing the user application to operate in the selected operating mode;
   the user interface operating to permit a user to select the one of the preselected number of operating modes of the user application with reference to the power characteristics.

9. The computer system of claim 8 wherein the power source comprises a battery.

10. The computer system of claim 8 wherein the power information module interrupts the user application when power characteristics have changed so that the power conservation module can operate to select one of the preselected number of operating modes of the user application as a function of the power characteristics obtained from the power information module.

11. The computer system of claim 8 wherein the user application periodically polls the power information module to obtain the power characteristics.

12. The computer system of claim 8 further comprising a callback routine in the power information module to communicate power characteristic changes to the power conservation module.

13. The computer system of claim 8 wherein one of the preselected number of operating modes comprises a read only mode.

14. The computer system of claim 8 wherein the power characteristics of the power source include identification of a battery as the power source and remaining power capacity of the battery.

15. The computer system of claim 9 the power conservation module selects another of the preselected number of operating modes of the user application upon the user interface selecting such another one of the preselected number of operating modes of the user application.

16. A computer system comprising:
   a CPU controlled by an operating system and adapted to run software applications;
   a software application, installed on and run by the CPU under the control of the operating system, the software application including a user interface for control of the software application by a user, the software application further including at least a first operation and a second operation;
   a power source for the CPU;
   a power information module for determining power characteristics of the power source; and
   a power conservation module;
   the software application operating in any one of a preselected number of power consumption operating modes, each power consumption operating mode controlling operating characteristics of the software application including the execution of the first operation and the second operation;
   at least one of the power consumption operating modes suspends execution of one of the first operation and the second operation and allows execution of one of the second and the first operation;
   the power conservation module obtaining the power characteristics from the power information module, selecting one of the preselected number of power consumption operating modes of the software application as a function of the power characteristics obtained from the power information module, and causing the software application to operate in the selected power consumption operating mode.

* * * * *